Bishop & Stevely,
Excavator,

Nº 45,967. Patented Jan. 24, 1865.

Witnesses:

Inventor:
Bishop & Stevely
per Daniel Breed Atty

UNITED STATES PATENT OFFICE.

STEPHEN T. BISHOP AND ANDREW STEVELEY, OF FOND DU LAC, WISCONSIN.

IMPROVEMENT IN HORSE-POWER ELEVATORS AND EXCAVATORS.

Specification forming part of Letters Patent No. 45,967, dated January 24, 1865.

*To all whom it may concern:*

Be it known that we, STEPHEN T. BISHOP and ANDREW STEVELEY, of Fond du Lac, in the county of Fond du Lac and State of Wisconsin, have invented a new and useful Improvement in Excavators and Elevators; and we do hereby declare that the following is a full and exact description thereof, reference being had to the accompanying drawings, and to the letters of reference marked thereon.

Our invention consists in certain peculiar improvements or arrangements of hooks and buckets upon an endless chain for use in excavating and elevating earth in grading railroads, and for other purposes.

We have filed several other applications for patents upon the machine represented in the accompanying drawings, and therefore in this application we confine our claims to the endless chain and the hooks, buckets, and other devices attached to the chain.

Figure 1:
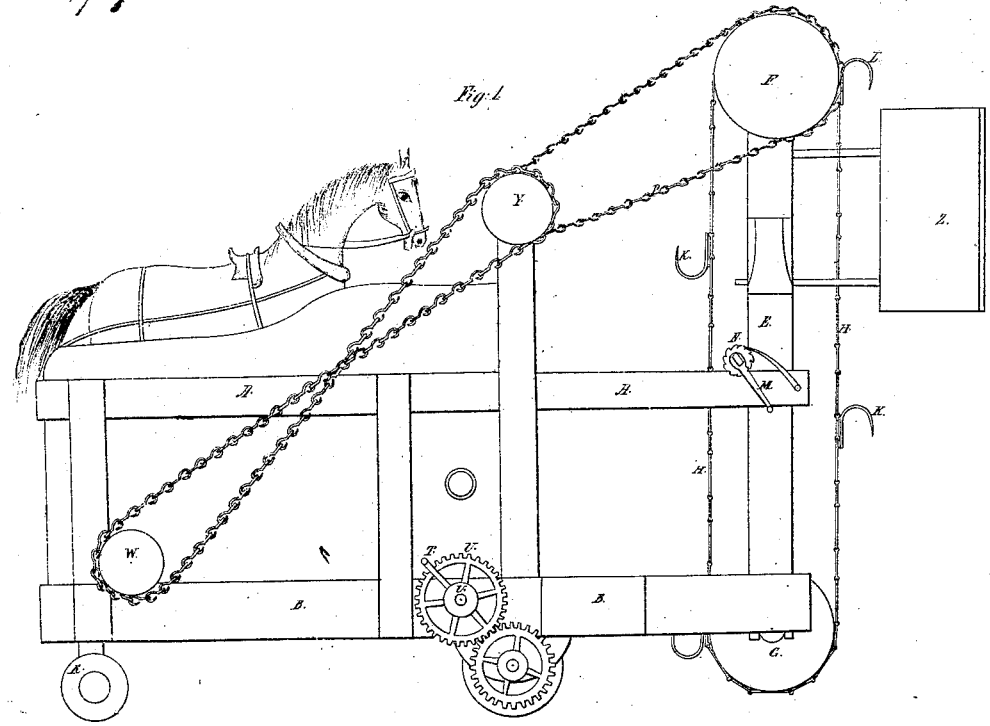
Figure 2:
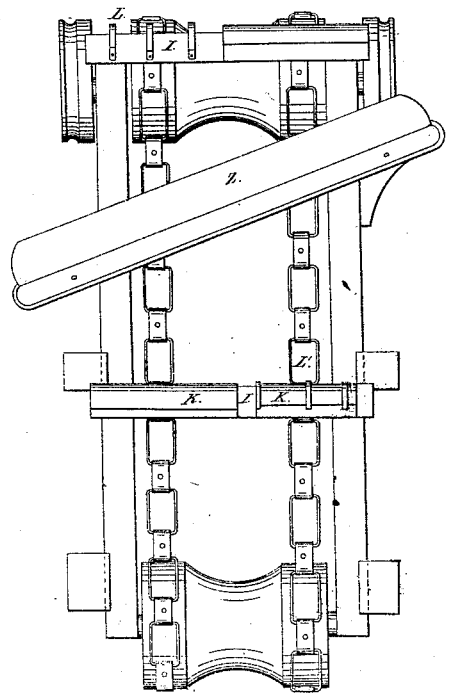

In the accompanying drawings, Figure 1 is a side elevation of our combined horse-power and excavator and elevator. Fig. 2 is a front view of the same.

The horse-power herein shown may have the ordinary endless apron, and be combined with an excavator and elevator upon the same frame, the two machines being united in one. As seen in Fig. 1, this combined machine is provided with the wheels or rollers R and S, and two gear-wheels, U and V, for moving the entire machine with the horse upon the same. The wheel U has a crank, Y, by means of which the operator turns the gear-wheels, and thus moves the machine as the work of excavation proceeds. The endless chain H revolves upon the pulleys F and G, being set in motion by the horse-power, the motion being transmitted by means of the chains O and P and the pulleys, as represented in Fig. 1. Several bars I are attached to the endless chain H, as seen in Fig. 2. To these bars are riveted a series of hooks or diggers, L, curved more or less, according to the nature of the earth to be excavated. We prefer to attach these hooks upon one half or end of the bar I, while we attach buckets K to the other end or half of bar, as seen in Fig. 2. It will be observed that the buckets and hooks are placed alternately upon the right and the left hand side of the machine. In working sand or gravel we sometimes prefer to place a shallow bucket upon the hooks, as seen at K' and L', Fig. 2, so that the points of the hooks may project a short distance beyond the lip of the bucket. We also find it necessary to vary the shape of the hook and the bucket, according to the character of the earth to be excavated. The bar I we regard as very important in securing the hooks and buckets to the chain. The frame E is made adjustable upon the horizontal pieces A and B, and may be raised and lowered, with the pulleys F G and the chain and buckets, by means of a crank, M, and the ratchet N, two other ratchet-wheels on the same shaft working into notches or notched bars on the frame E.

We are aware that buckets have been used upon an endless chain, and that hooks or barbs have been attached to the lips of buckets, but such hooks are liable to be broken off, as the lip of the bucket cannot bear the necessary strain for working in hard ground; but our hooks, being firmly riveted or bolted to bar I, may be driven into hard earth or grave up to the heel of the hooks without injury. A single hook may catch an immovable stone, and thus stop the horse and machine without the least damage.

Having thus fully described our invention, what we claim, and desire to secure by Letters Patent of the United States, is—

1. The combination of the hooks L with the bars I and the endless chain, substantially as set forth.

2. The use of the bar I, for attaching the hooks or buckets, or both, to the endless chain, substantially as described.

3. The arrangement of hooks upon one part of the bar I, and at the same time putting a bucket or buckets upon the other part or end of the bar, substantially as specified.

4. The arrangement of the hooks and buckets alternately upon successive bars I, substantially in the manner and for the purposes set forth.

In testimony whereof we have hereunto subscribed our names in the presence of witnesses.

STEPHEN T. BISHOP.
ANDREW STEVELEY.

Witnesses to the signature of Stephen T. Bishop:
DANIEL BREED,
G. BREED.

Witnesses to the signature of Andrew Steveley:
W. F. KELLOGG,
S. M. IVES.